(12) United States Patent
Pawlowski et al.

(10) Patent No.: US 7,662,544 B2
(45) Date of Patent: Feb. 16, 2010

:unselectable-end:(54) METHOD FOR MANUFACTURING A MASTER, MASTER, METHOD FOR MANUFACTURING OPTICAL ELEMENTS AND OPTICAL ELEMENT

(75) Inventors: Edgar Pawlowski, Stadecken-Elsheim (DE); Juergen Dzick, Seelze (DE); Wolfram Beier, Essenheim (DE); Bernd Woelfing, Mainz (DE)

(73) Assignee: Schott AG, Mainz (DE)

( * ) Notice: Subject to any disclaimer, the term of this patent is extended or adjusted under 35 U.S.C. 154(b) by 455 days.

(21) Appl. No.: 11/111,998

(22) Filed: Apr. 22, 2005

(65) Prior Publication Data

US 2005/0260349 A1 Nov. 24, 2005

(30) Foreign Application Priority Data

Apr. 23, 2004 (DE) ...................... 10 2004 020 363

(51) Int. Cl.
*B05D 5/00* (2006.01)
(52) U.S. Cl. ...................... 430/321; 216/67; 430/320; 430/296; 427/282
(58) Field of Classification Search ................ 216/66, 216/67, 72, 94, 45, 47; 430/321
See application file for complete search history.

(56) References Cited

U.S. PATENT DOCUMENTS

| | | | |
|---|---|---|---|
| 4,842,633 A | | 6/1989 | Kuribayashi et al. |
| 5,348,616 A | | 9/1994 | Hartman et al. |
| 5,575,962 A | * | 11/1996 | Takahashi ................ 264/2.5 |
| 5,783,371 A | * | 7/1998 | Bifano .................... 430/321 |
| 5,843,321 A | | 12/1998 | Kamihara et al. |
| 5,958,469 A | * | 9/1999 | Richards ................ 425/175 |
| 6,120,870 A | * | 9/2000 | Nebashi et al. .......... 428/64.1 |
| 6,591,636 B1 | | 7/2003 | Forenz et al. |
| 2002/0004182 A1 | * | 1/2002 | McReynolds ............ 430/313 |
| 2002/0168839 A1 | * | 11/2002 | Yanagi et al. ............ 438/551 |
| 2003/0067687 A1 | | 4/2003 | Barton et al. |
| 2004/0197595 A1 | * | 10/2004 | Callenbach et al. ........ 428/630 |
| 2004/0219464 A1 | * | 11/2004 | Dunham et al. ........... 430/320 |
| 2005/0058423 A1 | | 3/2005 | Brinkmann et al. |

FOREIGN PATENT DOCUMENTS

| | | |
|---|---|---|
| DE | 10322350 A1 | 12/2004 |
| EP | 0 354 235 B1 | 6/1989 |
| EP | 0 580 112 A1 | 1/1994 |
| JP | 57100637 * | 6/1982 |
| JP | 02-043380 * | 2/1990 |
| JP | 03-150738 * | 6/1991 |
| JP | 2003-342025 A | 12/2003 |
| WO | WO 03/020488 * | 3/2003 |

OTHER PUBLICATIONS

N. Koshida, K. Yoshida, S. Watanuki, M. Komuro, N. Atoda: Japanese Journal of Applierd Physics. 30(1991) 3246.*
Patent Abstracts of Japan, vol. 14, No. 487 (P-1121), Oct. 23, 1990, Japanese Patent No. 02199402, Aug. 7, 1990, Abstract.
Patent Abstracts of Japan, vol. 2002, No. 08, Aug. 5, 2002, Japanese Patent No. 2002 096333, Apr. 2, 2002, Abstract.
Patent Abstract, Optonix Seimitsu.KK, Dec. 3, 2003.
W.Lukosz et al., "Embossing techniques for fabricating integrated optical components in hard inorganic wave guiding materials," Optical Letters, Oct. 1983, vol. 8, No. 10, pp. 537-539, Swiss Federal Institute of Technology, 8093 Zurich, Switzerland.

* cited by examiner

*Primary Examiner*—Martin J Angebranndt
*Assistant Examiner*—Anna L Verderame
(74) *Attorney, Agent, or Firm*—Millen, White, Zelano & Branigan, P.C.

(57) ABSTRACT

Disclosed are a method for manufacturing of a master for manufacturing of optical elements having optically effective structures by molding structures, which are formed on the master, onto a surface of an optical substrate, by providing a substrate; coating a surface of said substrate for forming a coating on said substrate; and patterning said coating for forming structures in said coating; a master for manufacturing of optical elements; and a method for manufacturing of optical elements as well as to an optical element having at least one surface, wherein at least in portions of said surface optically effective structures are formed.

18 Claims, 7 Drawing Sheets

METHOD FOR MANUFACTURING A MASTER, MASTER, METHOD FOR MANUFACTURING OPTICAL ELEMENTS AND OPTICAL ELEMENT

FIELD OF INVENTION

The present invention generally pertains to the manufacture of optical elements with structures having an optical effect by moulding or hot embossing structures formed on a master or tool on a surface of an optical substrate. The present invention pertains, in particular, to a method for manufacturing such a master or tool, a master or a tool, as well as to a method for manufacturing such optical elements with diffractive and/or refractive structures. A further aspect of the present invention pertains to an optical element with structures having an optical effect produced on its surface.

BACKGROUND OF INVENTION

Optical elements of the aforementioned type are usually manufactured from transparent materials, for example, glass, glass ceramics or plastic. In order to reduce or compensate optical aberrations, the structures having an optical effect needed to be produced in a highly precise fashion. Manufacturing methods with mechanical processing steps are known for this purpose, for example, the grinding and polishing of lenses or the production of gratings, in particular of blazed gratings, by forming grooves on an optical substrate.

In other pertinent manufacturing methods known from the state of the art, the structures having an optical effect are produced by moulding or hot embossing structures produced on a master or a tool on the surface of an optical substrate. In this case, the structures produced on the master correspond to a negative of the structures having an optical effect to be produced. Hot-forming or hot-embossing methods are employed for moulding or hot embossing the structures produced on the master on the surface of the optical substrate. In these methods, the optical substrate is heated to a temperature, at which its surface can be deformed, wherein the optical substrate and the master are pressed against one another with sufficient pressure for moulding or hot embossing the structures produced on the master on the surface of the optical substrate. In another known method, the material of the optical substrate is poured or injected into a mould, in which the master is suitably arranged. The latter-mentioned method is particularly suitable for the mass production of optical elements consisting of plastic materials.

One common aspect of all aforementioned methods is that the master and the optical substrate need to be separated from one another (demoulded). This limits the attainable aspect ratio, i.e., the depth-to-width ratio, of the structures to be realized, namely to values of approximately 1:1. Since the moulding or hot embossing process always takes place near or above the melting temperature of the material of the optical substrate, it is unavoidable that the material of the optical substrate tends to adhere to the master during the demoulding process, i.e., when the master is lifted off the optical substrate. This lowers the accuracy of the moulding or hot embossing process and adversely affects the service life of the master and its precision. In this respect, it needs to be taken into account that the advantages of the aforementioned moulding techniques are only cost-effective if a large quantity of optical elements can be manufactured with constant precision by means of the same master without requiring costly subsequent processing steps. The reason for this can be seen, in particular, in the comparatively high costs for manufacturing precise masters and hot-forming or hot-embossing tools.

It is known to provide the surface of the master with a protective coating in order to prevent the material of the master from directly adhering to the optical substrate. Such a protective coating needs to fulfill strict requirements. The protective coating, in particular, needs to be connected to the substrate of the master in a rigidly adhering fashion, wherein the wettability of the protective coating with the material of the optical substrate should also be low. This significantly restricts the selection of materials for the protective coating, as well as the coating techniques for coating the master substrate. In addition, a highly homogenous and true-to-contour coating needs to be applied on the structured surface of the master with the chosen coating technique such that the coated structures on the surface of the master can be moulded or hot embossed on the substrate precisely. This additionally restricts the selection of materials for the protective coating and of the coating technique to be used.

The structures can be produced very precisely on the surface of a master substrate with techniques known from the manufacture of semiconductor components, particularly photolithography techniques. However, the protective coating leads to a certain distortion of the structures, particularly to the rounding of edges and to surface roughness. These effects need to be taken into account, in particular, when moulding very fine structures and/or structures with high aspect ratios.

Consequently, it would be desirable to develop precise and durable masters or tools for use in hot-forming and hot-embossing methods. Since the masters are used, in particular, for the mass production of optical elements, significant economical advantages can also be attained in the mass production of optical elements by means of costly manufacturing methods.

A method for embossing a waveguide in a deformable gel layer at room temperature is disclosed in "Embossing techniques for fabricating integrated optical components in hard inorganic wave guiding materials" by W. Lukosz et al., Optical Letters, October 1983, Vol. 8, No. 10, pp. 537-539. The thin film is produced from organometallic compounds by means of a dip-drawing method. After the embossing, the film is hardened at temperatures of several 100° C. and transformed into an inorganic oxide material. During the embossing, a substrate provided with the organic sol-gel thin layer is pressed against a master grating. The master grating is coated with an aluminum layer.

U.S. Pat. No. 6,591,636 B1 discloses a tool and a method for forming glass. Oxidation and corrosion processes were observed during the glass forming, particularly in the forming of glass compounds with significant alkali components and/or alkaliferous components. This leads, in particular, to undesirable dull glass surfaces. Different oxidation-resistant and corrosion-resistant compounds are suggested for coating the forming tool, wherein said compounds are applied by means of electroplating or physical vapor deposition (PVD) or chemical vapor deposition (CVD).

JP 2003-342025 A discloses a master for manufacturing finely structured optical elements, for example, microlens arrays, gratings, Fresnel zoned lenses and the like. The accuracy of the structures lies below one micrometer. The structures are initially produced by means of a photolithographic process on a dummy by means of synchrotron radiation. A nickel-based alloy is applied on the thusly structured dummy by means of electroplating. After the dummy is lifted off the coating, a master for manufacturing the optical elements is obtained.

SUMMARY OF INVENTION

It is an object of the present invention to provide a method for manufacturing a master, a master and a method for manufacturing optical elements that allow the manufacture of optical elements with structures having an optical effect in a more precise and less expensive fashion. The present invention also aims to make available an optical element that is realized in a more precise and less expensive fashion.

The present invention discloses a method for manufacturing a master for the manufacture of optical elements with structures having an optical effect by moulding or hot embossing structures formed on the master on the surface of an optical substrate, wherein said method comprises the following steps: providing a substrate; coating a surface of the substrate for producing a coating on the substrate, and structuring the coating for forming the structures to be moulded or hot embossed on the surface of the optical substrate within the coating.

Since the structures to be moulded or hot embossed are, according to the invention, directly produced within the coating or on a surface of the coating, respectively, their profile and accuracy is no longer impaired by an additional coating process as it is the case with the conventional application of a protective coating on an already structured master. Consequently, the invention makes it possible to achieve a finer structuring with a steeper and more precise edge steepness and a reduced roughness of the structures having the optical effect.

Another advantage of the invention can be seen in the fact that a large variety of different coating techniques and/or coating materials can be used, namely because the conditions during the coating process are significantly simplified in the method according to the invention (it is no longer necessary to uniformly coat already produced structures).

The quality of optical components can be additionally improved due to the fact that the invention makes it possible to realize a very uniform and homogenous coating with little surface roughness.

According to the invention, it is possible, in particular, to choose nearly arbitrary materials for the coating to be applied on the substrate, particularly materials that advantageously have a low wettability with the material of the optical substrate. Many of these materials for the coating of fine structures can, if at all, only be utilized with great difficulties in methods known from the state of the art.

It was determined that an ion beam etching (IBE) method, a reactive ion beam etching (RIE) method or a chemical-assisted ion beam etching (CAIBE) method is particularly suitable for structuring the coating because these methods make it possible to produce the structures within the coating in a very precise and homogenous fashion.

Other aspects of the present invention pertain to a master for manufacturing optical elements, a method and a device for manufacturing optical elements and an optical element with at least one surface, on which structures having an optical effect, particularly diffractive and/or refractive structures, are at least sectionally produced.

BRIEF DESCRIPTION OF DRAWINGS

The invention is described in an exemplary fashion below with reference to the enclosed figures that elucidate other characteristics, advantages and objectives to be attained, wherein.

Identical or identically functioning elements or groups of elements are identified by the same reference symbols in all figures.

DETAILED DESCRIPTION OF EXEMPLARY EMBODIMENTS

Figure 1:
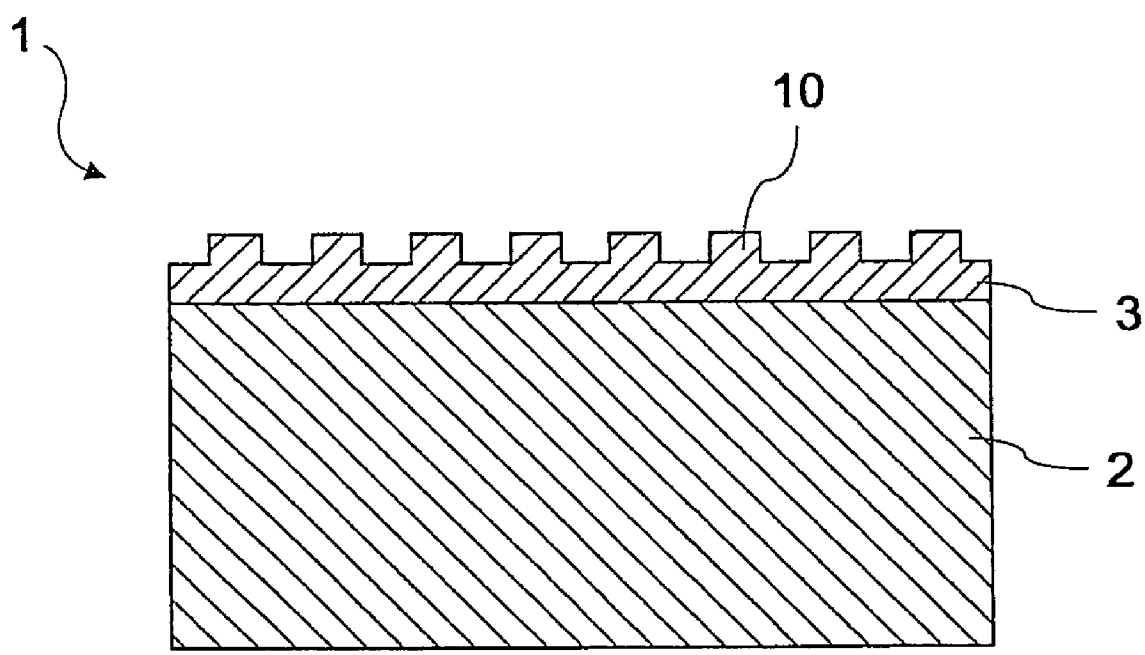
FIG. 1 shows a schematic cross section through a master for manufacturing optical elements according to the present invention.

FIG. 1 shows a schematic cross section through a master for manufacturing optical elements according to the present invention. The master preferably serves as a negative for structures, which have an optical effect and are to be formed on the surface of an optical substrate. According to FIG. 1, the master that is identified as a whole by the reference symbol 1 comprises a substrate 2, on the surface of which the coating 3 is formed. The substrate 2 has a sufficient dimensional stability for withstanding the pressures and temperatures used in hot-forming and hot-embossing methods. The substrate 2 preferably consists of steel, tungsten carbide (WC) or molybdenum (Mo). According to FIG. 1, the coating 3 is structured, i.e., provided with structures 10 that serve as negatives of the structures, which have an optical effect and are to be moulded or hot-embossed on the (not-shown) optical substrate. According to FIG. 1, the structures 10 are produced within the coating 3. The structures 10 are produced, in particular, on the surface of the coating 3 that points away from the substrate 2. According to the invention, the coating 3 is applied on the upper side of the substrate 2 by means of direct deposition of a coating material as described in more detail below and connected in a rigidly adhering fashion to the substrate 2 over its entire surface.

According to FIG. 1, the structures 10 comprise a series of essentially rectangular elevations and depressions on the surface of the coating 3. However, the present invention is not limited to essentially rectangular structures within the coating. On the contrary, the structures 10 according to the present invention may also have any other profile, namely in dependence on the optical effects that should be achieved with the structures having an optical effect and to be produced on the optical substrate. The respective profile of the structures is also dependent on the methods used for structuring the coating 3 as described in greater detail below.

According to FIG. 1, the depressions on the surface of the coating 3 do not extend completely to the surface of the substrate 2. On the contrary, a layer of the material of the coating 3 that has a certain minimum thickness also remains on the bottom of the depression. In the embodiment according to FIG. 1, it is always ensured that the material of the optical substrate does not come in contact with the material of the substrate 2 during the moulding or hot embossing of the structures 10, namely because a layer of the material of the coating 3 that has a certain minimum thickness always remains between the optical substrate and the substrate 2 of the master 1.

According to the invention, the material of the coating 3 is chosen such that the coating 3 has the lowest wettability possible referred to the material of the optical substrate, on which the structures having an optical effect are moulded or hot-embossed. This means that the material selection, in principle, is dependent on the material of the optical substrate. When hot-forming or hot-embossing glass substrates or glass ceramics substrates, it proved particularly advantageous to utilize a coating of a precious metal or a precious metal alloy, namely because the coating 3 can be advantageously realized such that it has a low wettability with the material of the optical substrate in this case. For example, the coating 3 may consist of an alloy of platinum (Pt) and rhodium (Rh).

It also proved advantageous to utilize materials for the coating 3 that inhibit oxidation and/or corrosion in glass or glass ceramics. Materials of this type are disclosed in U.S. Pat. No. 6,591,636 B1, the whole content of which is hereby expressly included in this application by reference. Exemplary materials that can be used, in particular, for producing the coating 3 according to the invention are:

| | | |
|---|---|---|
| Cr | MCrAlY | SiC/MO |
| $Cr_2O_3$ | Dura-Nickel 301 | $ZrO_2$ |
| $Cr_2O_3Si$ | Stellite 6 | CoCrAlY |
| CrN/CrC | MgO | Pt/Rh |
| TiC | Ni/N | Ir |
| TiCN | $Al_2O_3$ | ErO |
| TiAlN | Nb/NbC | $TiB_2$ |
| $TiC/Al_2O_3$ | $B_4C/W$ | NiWB |
| TiN | $B_4C/MO$ | MgAlY |
| TiCN/TiC/TiCN/TiN | SiC/W | |

According to the invention, the minimum thickness d of the coating 3, in principle, is only subject to very few restrictions. For reasons of quality and material saving, it should be attempted, in principle, to maintain the thickness d as small as possible, preferably such that the depressions of the structures 10 do not extend completely to the surface of the substrate 2. The minimum thickness d of the coating 3 is generally defined by the profile of the structures 10 to be moulded or hot-embossed on the optical substrate. If diffractive structures should be moulded or hot-embossed by means of the structures 10, for example, diffraction gratings, blazed diffraction gratings, holographic diffraction gratings, Fresnel lenses, Fresnel zoned lenses and the like, the minimum thickness d of the coating 3 is preferably chosen such that $d \geq \lambda/\Delta n$ applies, wherein $\lambda$ corresponds to a wavelength of the light that should be diffracted by the structures having a diffractive optical effect, and wherein $\Delta n$ corresponds to the difference between the refractive index of the material of the optical substrate, in which the structures having an optical effect should be produced, and the refractive index of air. For example, when manufacturing diffractive structures for diffracting laser light of a $CO_2$ laser with a wavelength of 10.6 μm and the optical substrate consists of Si with a refractive index of approximately n=3.4, the minimum thickness d of the coating 3 in accordance with the above formula amounts to approximately 4 μm. Corresponding minimum thicknesses d of the coating 3 for diffracting light in the visible and near-infrared range approximately lie between no less than 1 and 2 μm.

If the structures 10 of the coating 3 are used for producing refractive optical elements, for example, microlenses, microlens arrays, microprisms, microscopic mirrors or the like, the minimum thickness d of the coating 3 is defined by the minimum height of these refractive structures on the surface of the optical substrate. However, the invention practically is not subject to any restrictions on in this respect because layers with nearly arbitrary layer thicknesses can be easily applied on the substrate 2 by means of suitable coating techniques.

According to FIG. 1, the upper side of the substrate 2 is plane. The roughness of the upper side of the coating 3 is defined by the material of the coating 3 and the chosen coating method, but may also be influenced by the roughness of the upper side of the substrate 2. For example, if the upper side of the substrate 2 is comparatively rough, the upper side of the coating 3 is also comparatively rough, at least if the thickness d is relatively small. Depending on the chosen process parameters, the surface of the substrate 2 may also be fine-polished or lapped.

According to FIG. 1, the upper side of the substrate 2 is realized in a plane fashion, i.e., it contains no depressions, elevations or steps. However, the invention, in principle, is also suitable for substrates with elevations and/or depressions on their surface, for example, substrates that are provided with depressions, elevations and/or steps such as those illustrated in an exemplary fashion in FIGS. 2a and 2b.

Figure 2A:
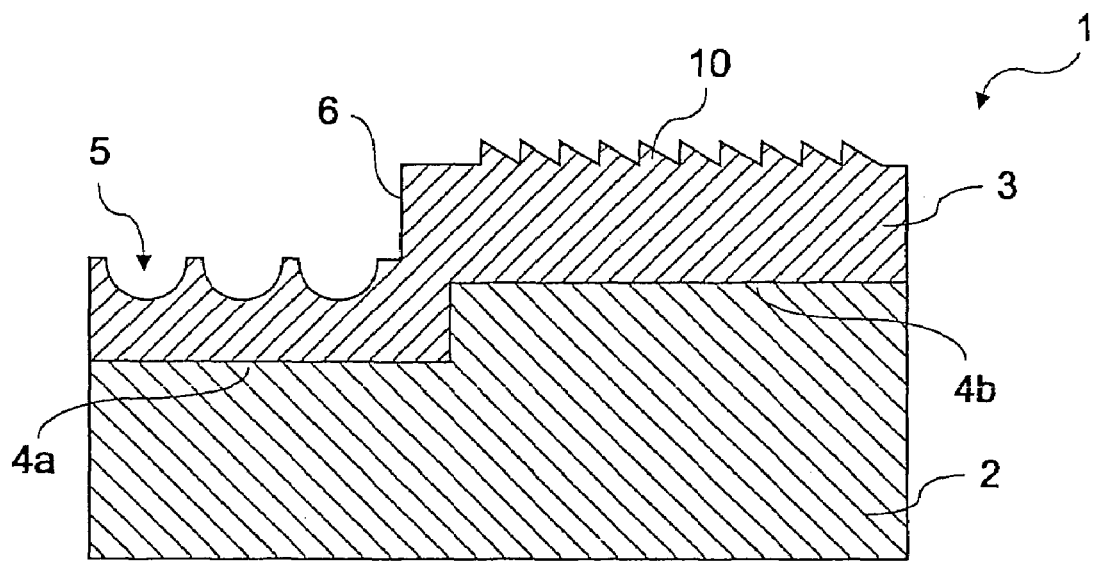
FIGS. 2a-2b respectively show a schematic cross section through another embodiment of a master for manufacturing optical elements according to the present invention.

Other embodiments of a master according to the invention are described below with reference to FIGS. 2a-2b. According to FIG. 2a, the substrate 2 of the master 1 comprises a first plane section 4a and a second plane section 4b, wherein a step is formed between these plane sections. A coating 3 of predetermined thickness is applied on this stepped substrate 2. Consequently, the step in the substrate 2 automatically produces a step-shaped transition region 6 within the coating 3.

Subsequently, the coating 3 is structured in order to form several spherical depressions 5 that are equidistantly spaced apart from one another above the first plane section 4a and a series of sawtooth-shaped projections 10 that are equidistantly spaced apart from one another above the second plane section 4b. An optical element such as that illustrated in an exemplary fashion in FIG. 7 can be manufactured by moulding or hot embossing the structures of the coating 3. According to FIG. 7, the optical element 40 comprises refractive optical elements as well as diffractive optical elements, namely an array of spherical microlenses 43 on the left side and a blazed diffraction grating 42 on the right side, wherein a step is arranged between the diffractive region 42 and the refractive region 43.

Figure 2B:
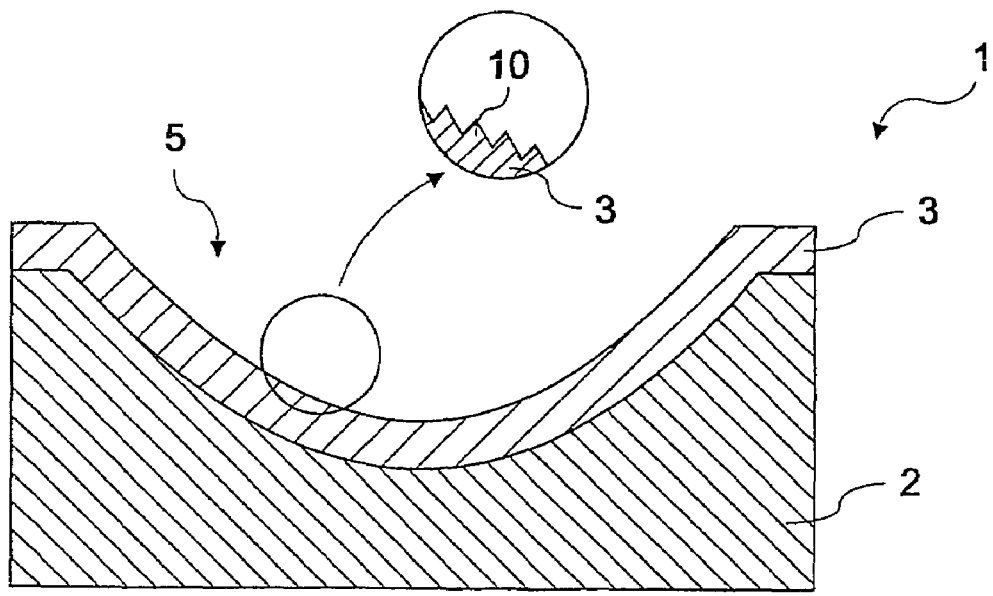

FIG. 2b shows another embodiment, in which a concave recess or cavity 5 is formed in the substrate 2. After the moulding or hot-embossing, this results in a convex surface, for example, the convex surface of an optical lens. A coating 3 of constant thickness is formed on the surface of the substrate 2. Although the substrate 2 is realized comparatively large, a plurality of microstructures are formed in the surface of the coating 3 as indicated in the enlarged partial section. According to this enlarged partial section, a sawtooth profile 10 is formed on the surface of the coating 3. An optical element with a convex surface, in which a plurality of sawtooth-shaped depressions and elevations are formed, can be manufactured by moulding the structures of the master 1 shown in FIG. 2b.

Figure 2C:
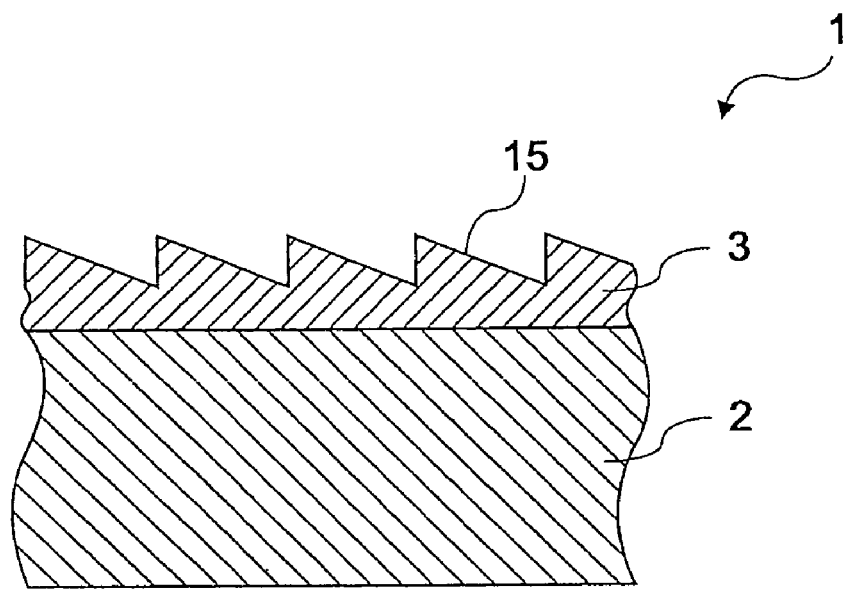
FIG. 2c shows an enlarged partial section through a master for manufacturing a blazed diffraction grating with continuous profile.

According to FIG. 2c, the respective sawtooth-shaped flanks produced within the coating 3, in principle, may sectionally extend in a continuous fashion, i.e., from edge to edge. However, this requires the utilization of a method that is suitable for respectively producing such sectionally continuous structures 15 within the coating 3 as described in more detail below.

The microstructures, in principle, may also be formed in several processing steps that are carried out successively. It is known from the state of the art that, in principle, microstructures with $2^m$ vertical steps can be produced in m processing steps. According to FIG. 2d, the sawtooth profile shown in FIG. 2c can be approximated with continuous flanks by choosing the graduation of the microstructures 16 accordingly. Stepped structures such as those shown in FIG. 2d can be used, according to the invention, for realizing computer-generated holograms within the coating 3 of the substrate 2.

Figure 3A:
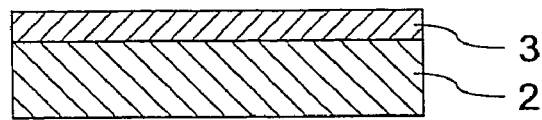
FIGS. 3a-3d respectively show a schematic cross section of the steps for manufacturing the master according to FIG. 1.

Exemplary processing steps for manufacturing the master shown in FIG. 1 are described below with reference to FIGS. 3a-3d. FIG. 3a shows that the method according to the invention for manufacturing a master begins with a substrate 2 that is provided with a coating 3. This coating is illustrated with a constant thickness in FIG. 3a, but may, in principle, comprise sections with different constant thicknesses. The substrate 2 preferably consists of a plane-parallel substrate with little surface roughness. On a larger scale than that of the structures having an optical effect to be produced, the substrate 2 may, in principle, also be provided with a profile as illustrated in an exemplary fashion in FIG. 2b.

The method used for coating the substrate 2 depends on the composition of the coating 3 and on the desired properties of the coating 3, particularly its surface roughness. Examples of suitable methods are: electroplating, plasma spray coating, sputtering, magnetron sputtering, plasma-assisted sputtering, ion beam sputtering (IBD), physical vapor deposition (PVD), chemical vapor deposition (CVD), electron-assisted or plasma-assisted physical vapor deposition (EB-PVD; IB-PVD), as well as electron beam-assisted or ion beam-assisted deposition (EBAD; IBAD), PICVD, PECVD, MOCVD and molecular beam epitaxy (MBE).

Investigations carried out by the inventors showed that an average surface roughness of approximately 100 nm rms (root mean square) suffices for optical wavelengths on the order of approximately 10 μm (for example, $CO_2$ lasers), that an average surface roughness of less than approximately 5 nm rms suffices for applications in the visible and ultraviolet spectral range, and that an average surface roughness of less than approximately 1 nm rms suffices for the utilization in photolithographic exposure devices (wafer-stepper).

A mask structure is applied on the thusly coated substrate shown in FIG. 3a, wherein said mask structure serves as a mask during a subsequent etching step for forming structures within the coating 3. Various etching techniques are known from the state of the art. The following exemplary description of processing steps is based on an ion beam etching method (IBE; frequently is also referred to as "ion beam milling" method). However, it is expressly stated that the following description of processing steps merely has an exemplary character, and that the invention also allows the utilization of any other dry-etching or wet-etching methods, particularly reactive ion beam etching (RIBE) and chemical-assisted ion beam etching (CAIBE).

Figure 3B:
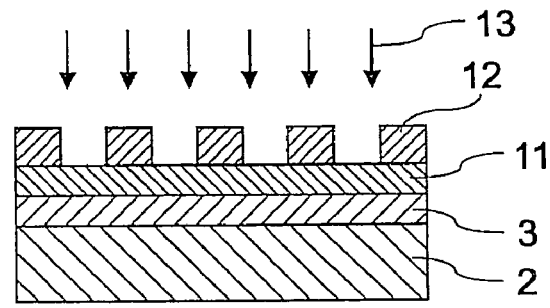

According to FIG. 3b, the coating 3 is covered with a photoresist layer 11 that is used for forming the desired pattern, for example, a periodic structure, a grating structure or another optical structure, in the photoresist layer 11 by means of optical exposure 13. The photoresist layer 11 is composed and prepared conventionally. The photoresist layer 11 is applied with a thickness that suffices for transferring a pattern onto the coating 3 situated underneath.

In order to form a suitable pattern in the photoresist layer 11, a mask 12 is brought in contact with the photoresist layer 11 or arranged directly above the photoresist layer 11 as shown in FIG. 3b. The mask 12 is subsequently exposed with light 13 of a suitable wavelength, for example, UV radiation. Light 13 transmitted through the transparent sections of the mask 12 causes a chemical change in the exposed sections of the photoresist layer 11 that manifests itself in the material properties of the photoresist layer 11.

Naturally, it is not absolutely imperative to utilize the mask 12 in the method according to the invention. For example, structures could also be directly written on the photoresist layer 11 with a light beam, preferably a laser light beam such as that of an excimer laser. According to another embodiment of the present invention, holographic patterns can be directly written on the photoresist layer 11, wherein the photoresist layer 11 is subjected to the interference of two coherent light beams, preferably laser light beams such as those, for example, of a UV excimer laser.

Figure 3C:
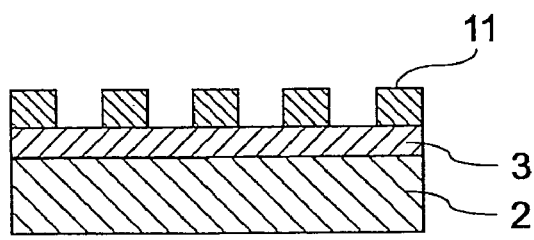
Figure 3D:
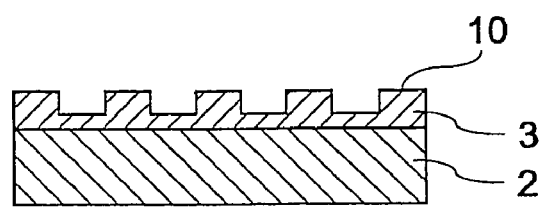

After the exposure, the mask 12 is removed, the photoresist layer 11 is developed with a developer and unexposed or exposed regions of the photoresist layer 11 are washed off depending on the type of photoresist used. After the photoresist is washed off, the desired pattern remains in the photoresist layer 11 as shown in FIG. 3c. This pattern can already be optically examined under a microscope and, if so required, touched up or even completely removed if the structures in the photoresist layer 11 were not produced satisfactorily. In this case, the processing steps shown in FIGS. 3a-3c are carried out anew until the desired pattern is formed in the photoresist layer 11.

The pattern of the photoresist layer 11 is subsequently used as a mask for an etching step in order to transfer the pattern to the coating 3. During this process, the regions of the coating 3 that are covered by the photoresist 11 do not react with the etching medium and consequently are not etched away. After the etching step is completed, the remaining sections of the photoresist are removed by utilizing conventional solvents.

Figure 3E:
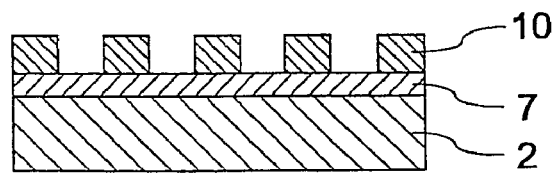
FIG. 3e shows a modification of the master according to FIG. 1 with an etch-stopping layer.

According to another embodiment of the present invention that is schematically illustrated in FIG. 3e, the etching step can be controlled even better if the coating 3 consists of two layers, namely a lower etch stopping layer 7 and a layer that is situated thereon and in which the structures 10 are produced. The material of the etch stopping layer 7 is more resistant to the etching-medium used than the material of the coating 3 situated thereon such that the etching process is stopped in a defined fashion when the etch stopping layer 7 is reached.

Figure 2D:
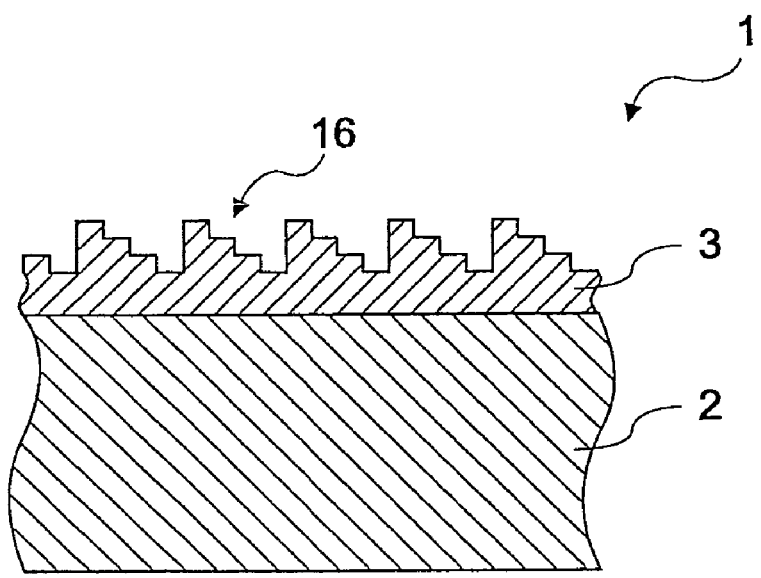
FIG. 2d shows an enlarged partial section through a master for manufacturing a blazed diffraction grating with stepped profile.

Naturally, the etching steps can also be repeated several times, for example, in order to produce stepped profiles as illustrated in an exemplary fashion in FIG. 2d. Naturally, the pattern formed on the photoresist layer 11 according to FIG. 3c can also be transferred to an intermediate layer disposed between the photoresist layer 11 and the coating 3 in a first etching step, for example, to a Si layer or to a $SiO_2$ layer. The thusly produced structure in this layer can be transferred to the coating 3 situated thereunder in a second etching step.

Figure 4:
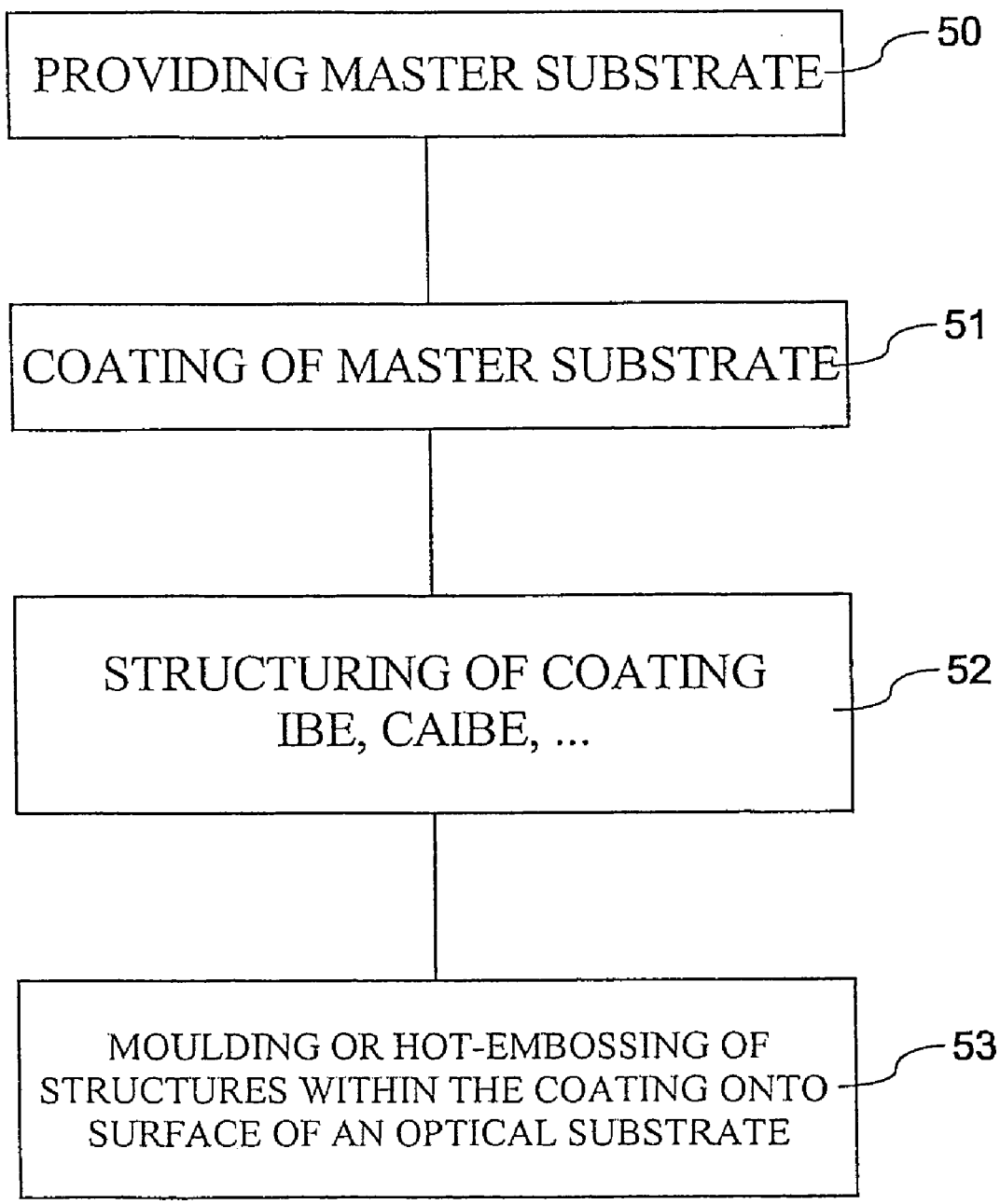
FIG. 4 shows the comprehensive steps for manufacturing a master according to the invention.

FIG. 4 summarizes the processing steps of a method according to the invention for manufacturing a master. It is once again expressly stated that nearly arbitrary coating methods can, according to the invention, be utilized for coating the substrate in processing step 51 as long as a sufficiently adhesion-resistant coating with a sufficient surface roughness can be produced. In the description of FIGS. 3a-3e, etching methods were used for structuring the coating. Upon studying the above description, a person skilled in the art can easily ascertain that the invention, in principle, also allows the utilization of other methods for structuring the coating as long as suitable profiles can be produced using these methods, particularly profiles with a suitable edge steepness, edge rounding, precision of the structures and fineness of the structures. A few preferred alternatives to the previously described etching method are summarized below.

According to the invention, the coating may, in principle, also be directly processed. For example, the surface of the coating may be subjected to a material removal or machining process carried out by means of a mechanical processing tool. For example, grooves are formed within the coating similar to the mechanical processing of optical diffraction gratings. Such mechanical processing methods may be particularly suitable for forming structures in coatings that are used for moulding or hot embossing refractive structures on the optical substrate, for example, convex or concave surfaces as illustrated in an exemplary fashion in FIG. 2b.

Another alternative that, according to the invention, is expressly intended for the direct processing of the coating consists of directly writing structures into the coating by means of an ion beam or electron beam. As is known, sections can be removed due to the hard impact of ion or electron beams on the coating region. The entire coating surface can be processed by scanning the surface of the coating with an ion or electron beam. The depth of the structures produced within the coating is defined by the applied voltage, the intensity of the ion or electron beam, the mass of the ions used and the geometry of the pattern produced on the surface of the coating by the ion or electron beam. According to the invention, the coating preferably consists of an electrically conductive material if the structures are directly produced within the coating by means of ion or electron beams such that an arrester for electric charges is formed.

Another alternative to the previously described etching methods consists of a laser ablation of the coating. The depth of the structures within the coating can be suitably defined by varying certain parameters, for example, the laser intensity, the laser power, the average pulse duration of laser pulses and the duration of irradiation.

Figure 5:
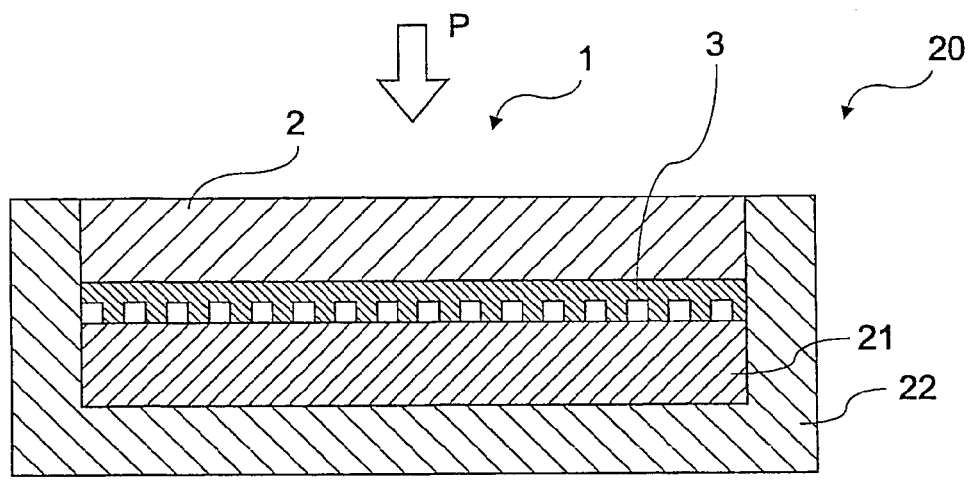
FIG. 5 shows a schematic cross section through a first embodiment of a device for manufacturing optical elements according to the present invention.

FIG. 5 shows a schematic cross section of a first embodiment of a device for manufacturing optical elements according to the present invention. The device 20 contains a groove-shaped or trough-shaped countermould 22, wherein an optical substrate 21 is accommodated in the bottom of the countermould 22. According to FIG. 5, the master 1 comprises a substrate 2 as well as the structured coating 3 and is pressed against the optical substrate 21 held by the countermould 22. In order to mould or hot-emboss the structures, at least the master 1 is heated to a temperature that lies above the melting temperature of the optical substrate 21 such that at least the surface of the glass substrate 21 can be deformed. A person skilled in the art can easily ascertain that the optical substrate 21 could also be introduced into the device 20 in the form of molten glass, glass ceramics or plastic, namely with a temperature that lies above the respective melting temperature. The structures within the coating 3 of the master 1 are transferred on the surface of the optical substrate 21 in this fashion, namely by means of hot-forming or hot-embossing.

Figure 6:
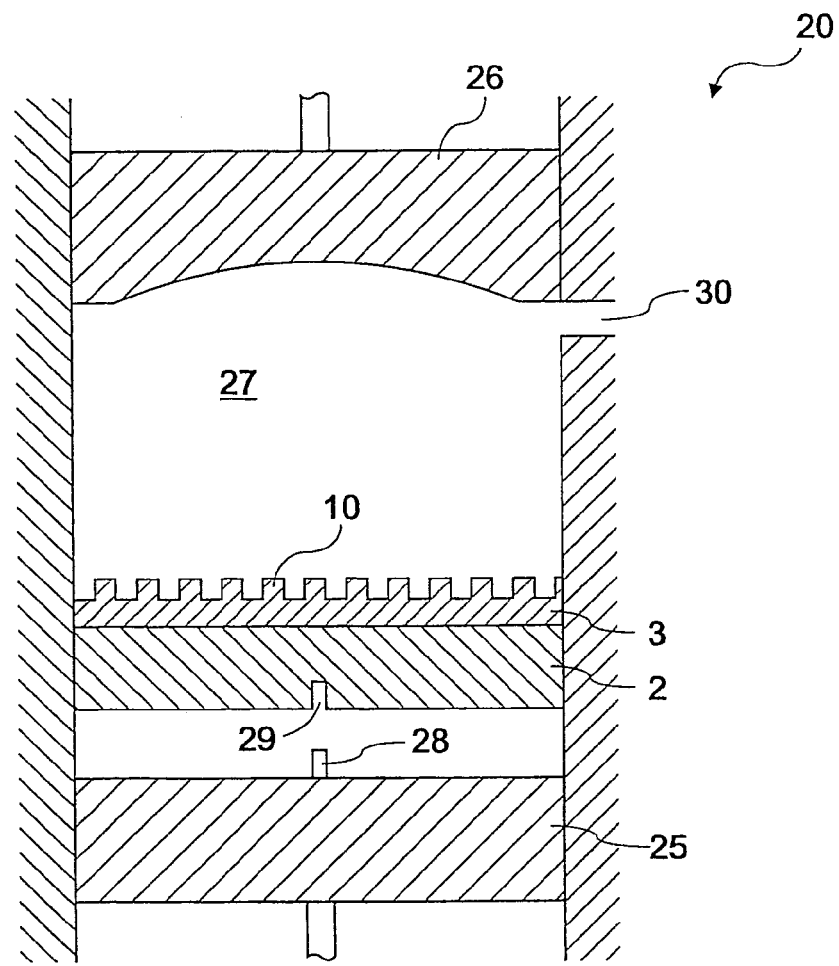
FIG. 6 shows a schematic cross section through a second embodiment of a device for manufacturing optical elements according to the present invention.

One can easily ascertain from the preceding description that one common aspect of the present invention pertains to the manufacture of a suitably structured master, i.e. a tool, for moulding or hot embossing structures having an optical effect. According to the invention, it is also possible to utilize other techniques for transferring the structures as described below in an exemplary fashion with reference to FIG. 6. A device for injection-moulding optical elements is described with reference to FIG. 6. The device 20 contains a cavity 27 that is limited by sidewalls, an upper die 26 and a lower die. At least the lower die is in the form of a master according to the invention comprising a substrate and a coating 3 that contains the structures 10 and is applied on the substrate. Alternatively, the upper die 26 may be in the form of a master according to the present invention as illustrated in an exemplary fashion in FIG. 2b. A pressure ram 25 provided underneath the master contains a centering pin 28 that engages into the recess 29 on the underside of the substrate 2 in order to precisely guide the lower die that serves as the master. The material of the optical element, for example, molten glass, molten glass ceramics precursor glass, molten glass ceramics green glass, liquid plastic or liquid polymer, is injected or poured into the cavity via the inlet 30.

According to the present invention, other embossing methods, in principle, may also be utilized. According to another embodiment (not-shown), for example, a plastic layer with suitable viscosity is applied on a substrate carrier, wherein structures having an optical effect are produced in this plastic layer with the aid of a master according to the present invention, namely by means of moulding or embossing. The thusly impressed structures can be hardened in the plastic layer by means of thermosetting or by subjecting the plastic layer, for example, to UV radiation.

One can easily ascertain from the preceding description that the material of the optical element according to the present invention can be selected from a variety of material classes. Glass types to be considered are: low/Tg glasses, soda-lime glass, silicate glass, borate glass, borosilicate glass, phosphate glass, fluoride glass, fluorophosphate glass, halide glass or optical glass. Plastic materials to be considered, in particular, for the optical element are: PMMI, COC (cycloolefin copolymer, particularly TOPAS, COP (cycloolefin polymer, particularly Zeonex, PMMA, polyurethane, PC, PS, SAN, PMP or PET. Naturally, the present invention also makes it possible to utilize optical elements that consist of a glass with a plastic coating. When using plastic materials, it is advantageous that the impression can take place at relatively low temperatures. Naturally, an optical element according to the present invention may consist of a combination of a normal glass and a low/Tg glass. The transfer method according to the invention naturally is also suitable for producing structures having an optical effect on other materials, for example, on semiconductor substrates. In this case, the structures having an optical effect consist of a plastic.

Figure 7:
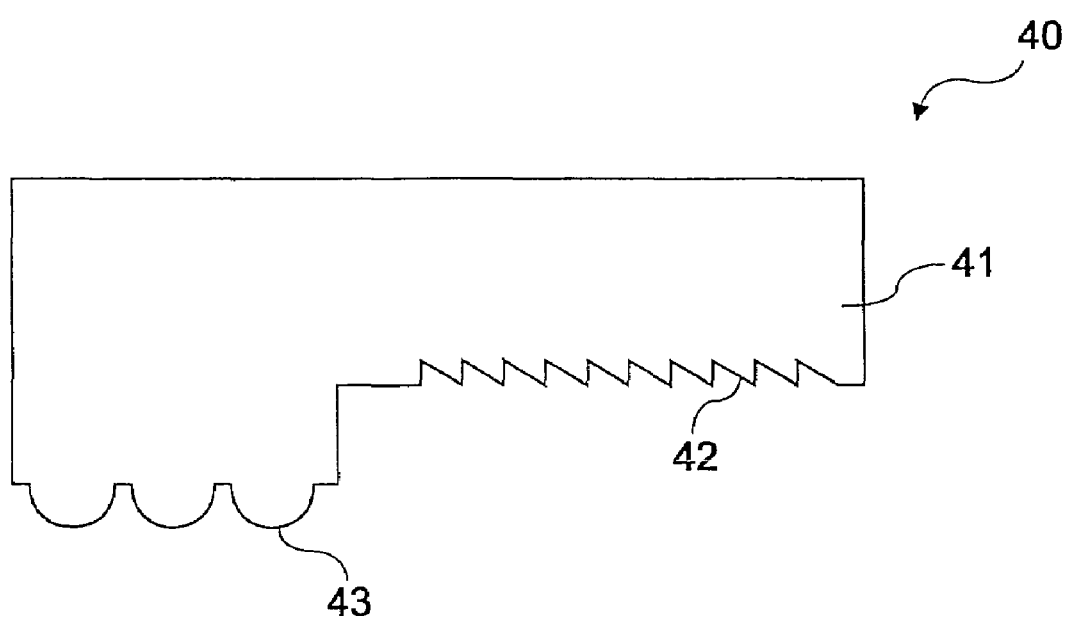
FIG. 7 shows an optical element according to the present invention that was manufactured using the master according to FIG. 2a and the surface of which contains diffractive as well as refractive structures.

One can easily ascertain from the preceding description that the present invention makes it possible to manufacture optical elements with arbitrary diffractive or refractive structures. In addition, the invention makes it possible to manufacture compact hybrid microlens systems that comprise diffractive as well as refractive elements. One example of such a hybrid microlens system is illustrated in FIG. 7. Furthermore, also a plano-convex lens can be manufactured with the device according to FIG. 6. The diffractive structures in the plane surface of such a plano-convex optical element are defined by the structures within the coating of the master and can be configured such that an altogether achromatic optical element is attained, i.e., the wavelength dependence of the refractive index of the material of the optical element can be compensated by means of a corresponding oppositely directed wavelength dependence of the diffractive structures in the plane surface of the optical element.

Other preferred applications of the optical element according to the present invention are, in particular, diffractive optical elements (DOEs), computer-generated holograms, optical lenses for mass applications, e.g., for digital cameras or mobile telephones, RGB laser displays, diffractive lens systems and microlens systems for high-energy lasers, diode lasers and diode-pumped solid-state lasers, diffraction gratings, particularly blazed diffraction gratings, and Fresnel zoned lenses.

Embodiment 1

A layer of $Al_2O_3$ with a thickness of 2000 nm was formed on a substrate of steel by means of ion beam deposition (IBD) of $Al_2O_3$. A Kaufmann source was used for the ion beam deposition. The working gas used for the ion beam consisted of argon (Ar), and the sputtering time was 106 min.

The $Al_2O_3$ coating formed on the substrate was structured by means of reactive ion etching (RIE) in a system of the type Vacutec 500. A gas flow of $CF_4$ (47 sccm) was used as the etching gas, and the working pressure amounted to approximately 160 mTorr. A chrome layer was applied as the etching mask before the etching process.

Groove-shaped structures for moulding or hot embossing a diffraction grating were produced in the $Al_2O_3$ coating by means of reactive ion etching. The maximum etching depth was 420 nm. A microscopic investigation with a magnification ×400 showed that no visible material removal took place in the Cr layer. Cr consequently can be used as a stable masking layer for the reactive ion etching with $CF_4$. The structures in the $Al_2O_3$ coating had a very high edge steepness and only showed slight edge rounding. The transfer of the structures to optical substrates, for example, glass or glass ceramics, was excellent.

Embodiment 2

A chrome layer (Cr) with a thickness of 100 nm was produced on a substrate of steel by means of DC magnetron sputtering. Chrome with a diameter of 3 inches and a purity of 99.99 (4N) was used as the target. The gas used during the sputtering process consisted of argon 5.0, and the pressure during the coating process amounted to approximately $7.5 \times 10^{-4}$ Torr. The coating time amounted to approximately 200 s.

A photoresist layer applied on the Cr coating was then exposed with a screen pattern in a photolithographic process. Unexposed photoresist layer sections were rinsed off. The thusly produced Cr coating on the substrate was manually etched in a wet-chemical process in a beaker under clean room conditions. An etching solution of $K_3Fe(CN)_6$ and NaOH was used. The temperature during the etching process was 50° C. The coating was rinsed with DI water for approximately 60 s after the etching process, and the substrate was subsequently dried by means of centrifuging for 40 s at a speed of 4000 rpm.

Groove-like structures for moulding or hot embossing a diffraction grating were produced within the Cr coating by means of the wet-chemical etching process. The maximum etching depth amounted to approximately 90 nm. A microscopic investigation with a magnification ×400 showed that no visible material removal took place in the Cr layer. The structures in the Cr coating had a very high edge steepness and only showed slight edge rounding. The transfer of the structures to optical substrates, for example, glass or glass ceramics, was excellent.

Embodiment 3

A layer of $ZrO_2$ with a thickness of 2000 nm was produced on a substrate of steel by means of ion beam deposition (IBD) of $ZrO_2$. A Kaufmann source was used for the ion beam deposition. The working gas for the ion beam consisted of argon (Ar), and the sputtering time amounted to approximately 138 min.

The $ZrO_2$ coating produced on the substrate was structured by means of ion beam etching (IBE). A Kaufmann source was used for this purpose, and the working gas for the ion beam consisted of Ar with a working pressure of $3.2 \times 10^{-4}$ mbar. A chrome layer with a thickness of 100 nm was applied as a masking layer and subsequently structured by exposing an AZ 5214 E photoresist (thickness: 1400 nm).

Groove-shaped structures for moulding or hot embossing a diffraction grating were formed within the $ZrO_2$ coating by means of reactive ion etching. The maximum etching depth amounted to 600 nm. A microscopic investigation with a magnification ×400 showed that no visible material removal took place in the Cr layer. The structures in the $ZrO_2$ coating had a very high edge steepness and only showed slight edge rounding. The transfer of the structures to optical substrates, for example, glass or glass ceramics, was excellent.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding German application No. 102004020363.6, filed Apr. 23, 2004 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A method for manufacturing a master for the manufacture of optical elements with structures having an optical effect by molding or hot embossing structures formed on the master onto a surface of an optical substrate, comprising
   providing a substrate;
   fine polishing or lapping a surface of the substrate;
   coating a surface of the substrate in order to form a coating on the substrate; and
   forming the structures directly within the coating by writing the structures into the coating by an ion or electron beam within the coating without use of a mask.

2. The method according to claim 1, wherein the coating of the surface of the substrate comprises the coating of the surface of the substrate with a material that lowers the wettability of the master with the material of the optical substrate.

3. The method according to claim 1, wherein the coefficient of thermal expansion of the material of the coating is matched to the coefficient of thermal expansion of the material of the substrate.

4. The method according to claim 1, wherein the forming of the structures directly within the coating comprises forming depressions within the coating, and wherein said depressions do not extend to the underside of the coating.

5. The method according to claim 1, wherein the forming of the structures directly within the coating comprises forming structures in at least one section of the coating, and wherein the structures cause formation of diffractive optical structures after the molding by hot-forming or hot-embossing.

6. The method according to claim 5, wherein the coating of the surface of the substrate comprises forming a coating with a thickness d that is defined by $$d \geq \lambda/\Delta n,$$

wherein
$\lambda$ corresponds to a wavelength of light that is refracted by the diffractive optical structures, and
$\Delta n$ corresponds to a difference between the refractive index of the material of the optical substrate and the refractive index of air.

7. The method according to claim 5, wherein the structures within the coating are formed in m processing steps, and wherein the structures are formed in a stepped fashion and comprise as many as $2^m$ different height levels.

8. The method according to claim 5, wherein the structures within the coating are computer-generated holograms.

9. The method according to claim 1, wherein the forming of the structure directly within the coating comprises forming structures at least in a section, said structures causing formation of refractive optical structures on the surface of the optical substrate after the molding by hot-forming or hot-embossing.

10. A method for manufacturing optical elements comprising structures having an optical effect, comprising
a) providing a master that comprises a substrate and a coating applied on the substrate, wherein structures have been formed within the coating by the following steps
providing a substrate;
fine polishing or lapping a surface of the substrate;
coating a surface of the substrate in order to form a coating on the substrate; and
forming the structures directly within the coating by writing the structures into the coating by an ion or electron beam within the coating without use of a mask,
and
b) molding or hot embossing the structures onto a surface of an optical substrate in order to form structures having an optical effect on the surface.

11. The method according to claim 10, wherein the molding or hot embossing of the structures comprises hot-forming or hot-embossing of the surface of the optical substrate.

12. The method according to claim 10, wherein the molding or hot embossing of the structures comprises embossing of a plastic or polymer layer and hardening of the plastic or polymer layer in order to form a layer, in which the structures having an optical effect are formed.

13. The method according to claim 12, wherein the plastic layer is provided as a synthetic resin layer.

14. The method according to claim 13, wherein the hardening of the synthetic resin layer comprises UV irradiation of the synthetic resin layer.

15. The method according to claim 10, wherein the molding or hot embossing of the structures comprises
a) providing a cavity with at least one wall section that is formed by a master produced by
providing a substrate;
coating a surface of the substrate in order to form a coating on the substrate; and
structuring the coating in order to form structures within the coating; and
b) injection-molding, pressing, blowing or pressing-and-blowing one of a molten glass, a molten glass ceramics precursor glass, a plastic and a polymer into the cavity in order to form the optical substrate, the surface of which comprises the structures having an optical effect.

16. An optical element with at least one surface, on which structures having an optical effect are at least sectionally formed, wherein the structures having an optical effect are produced by a method comprising
a) providing a master that comprises a substrate and a coating applied on the substrate, wherein structures have been formed within the coating by the following steps
providing a substrate;
fine polishing or lapping a surface of the substrate;
coating a surface of the substrate in order to form a coating on the substrate; and
forming the structures directly within the coating by writing the structures into the coating by an ion or electron beam within the coating without use of a mask,
and
b) molding or hot embossing the structures onto a surface of an optical substrate in order to form structures having an optical effect on the surface.

17. The method according to claim 1, wherein forming the structures directly within the coating is by writing the structures into the coating by an ion beam without use of a mask.

18. A method for manufacturing a master for the manufacture of optical elements with structures having an optical effect by molding or hot embossing structures formed on the master onto a surface of an optical substrate, comprising
providing a substrate that has been
fine polished or the surface of which has been lapped, and then coated to form a coating on the substrate;
and forming the structures directly within the coating by writing the structures into the coating by an ion or electron beam or by laser ablation within the coating without use of a mask.

* * * * *

UNITED STATES PATENT AND TRADEMARK OFFICE
CERTIFICATE OF CORRECTION

PATENT NO. : 7,662,544 B2
APPLICATION NO. : 11/111998
DATED : February 16, 2010
INVENTOR(S) : Pawlowski et al.

It is certified that error appears in the above-identified patent and that said Letters Patent is hereby corrected as shown below:

Column 14, line 53 reads "beam or by laser ablation within the coating without use of a" should read --beam within the coating without use of a--

Signed and Sealed this

Sixth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,662,544 B2 Page 1 of 1
APPLICATION NO. : 11/111998
DATED : February 16, 2010
INVENTOR(S) : Pawlowski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 684 days.

Signed and Sealed this

Thirtieth Day of November, 2010

David J. Kappos
*Director of the United States Patent and Trademark Office*